United States Patent
Ewen et al.

(10) Patent No.: US 7,610,264 B2
(45) Date of Patent: Oct. 27, 2009

(54) METHOD AND SYSTEM FOR PROVIDING A LEARNING OPTIMIZER FOR FEDERATED DATABASE SYSTEMS

(75) Inventors: Stephan Eberhard Ewen, Stuttgart (DE); Volker Gerhard Markl, San Jose, CA (US); Michael Ortega-Binderberger, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 277 days.

(21) Appl. No.: 11/068,253

(22) Filed: Feb. 28, 2005

(65) Prior Publication Data

US 2006/0195416 A1 Aug. 31, 2006

(51) Int. Cl.
*G06F 17/30* (2006.01)
(52) U.S. Cl. .............................. 707/2; 707/5
(58) Field of Classification Search ...................... 707/2, 707/5
See application file for complete search history.

(56) References Cited

U.S. PATENT DOCUMENTS

| | | | |
|---|---|---|---|
| 5,899,986 A | 5/1999 | Ziauddin | |
| 6,029,163 A | 2/2000 | Ziauddin | |
| 6,272,487 B1 | 8/2001 | Beavin et al. | |
| 6,353,818 B1 * | 3/2002 | Carino, Jr. ...................... 707/2 |
| 6,360,214 B1 | 3/2002 | Ellis et al. | |
| 6,385,608 B1 | 5/2002 | Mitsuishi et al. | |
| 6,389,430 B1 | 5/2002 | Parker | |
| 6,460,045 B1 | 10/2002 | Aboulnaga et al. | |
| 6,529,901 B1 | 3/2003 | Chaudhuri et al. | |
| 6,662,175 B1 | 12/2003 | Ghazal et al. | |
| 6,763,359 B2 | 7/2004 | Lohman et al. | |
| 7,447,681 B2 | 11/2008 | Lightstone et al. | |
| 7,478,083 B2 | 1/2009 | Corvinelli et al. | |
| 2002/0198867 A1 | 12/2002 | Lohman et al. | |
| 2002/0198896 A1 | 12/2002 | Chaudhuri et al. | |
| 2003/0088579 A1 | 5/2003 | Brown et al. | |
| 2003/0212664 A1 * | 11/2003 | Breining et al. ................. 707/3 |
| 2004/0034643 A1 | 2/2004 | Bonner et al. | |
| 2004/0098358 A1 | 5/2004 | Roediger | |
| 2005/0097072 A1 | 5/2005 | Brown et al. | |

(Continued)

OTHER PUBLICATIONS

Michael Stillger, et al. *LEO-DB2's Learning Optimizer*, Proceedings of the 27th VLDB Conference, Roma Italy, 2001, http://www.dia.uniroma3.it/~vldbproc/006_019.pdf.

(Continued)

*Primary Examiner*—Isaac M Woo
*Assistant Examiner*—Johnese Johnson
(74) *Attorney, Agent, or Firm*—IP Authority, LLC; Ramraj Soundararajan (57) ABSTRACT

A method and system for accelerating execution of a query on a federated database system. The federated database system is associated with an external data source, which is used by the query. The query is performed based upon a query execution plan. The method and system include generating an optimizer query for the external data source utilized by the query. The optimizer query is based on the query and obtains data related to the external data source. The method and system further include providing the optimizer query to the external data source and collecting at least one resultant from the optimizer query for use in generating a future query execution plan.

14 Claims, 4 Drawing Sheets

U.S. PATENT DOCUMENTS

| | | |
|---|---|---|
| 2005/0102325 A1 | 5/2005 | Gould et al. |
| 2005/0114368 A1 | 5/2005 | Gould et al. |
| 2005/0114369 A1 | 5/2005 | Gould et al. |
| 2005/0138015 A1 | 6/2005 | Dageville et al. |
| 2005/0278357 A1 | 12/2005 | Brown et al. |

OTHER PUBLICATIONS

Clint Boulton, *Big Blue Aiming 'Stinger' at Oracle, Microsoft*, May 3, 2004, http://www.interentnews.com/ent-news/article.php/3348331.

Microsoft Corporation., How SQL Server 7.0 and SQL Server 2000 Autostats Work, Article ID 195565, Oct. 25, 2004 Revision 5.0.

Aboulnaga et al., Automated Statistics Collection in DB2 Stinger, Proceedings of the 30th VLDB Conference, 2004, Toronto, Canada.

Volker et al., Automated Statistics Collection in DB2 Stinger, IDUG 2004—North America, Wednesday, May 12, 2004, 40 pages, IVM SWG, Session E11.

Volker Markl, DB2's LEarning Optimizer, Assistentenarbeit, IBM Confidential, Jun. 2-Aug. 29, 2003, 29 pages, IBM Almaden Research Center, San Jose, USA.

Peter Haas, FWH: Testing for Causes of Error, Jul. 15, 2003, 3 pages.

Volker et al., Definition and Notation Draft, 3 pages.

LEO-DB2's Learning Optimizer, Automatic Statistics Profiling, vol. 8.2 LI 3119, IBM Research, 6 pages.

Lim et al., SASH: A Self-Adaptive Histogram Set for Dynamically Changing Workloads, Proceedings of the 29th VLDB Conference, 2003, 12 pages, Berlin, Germany.

Burleson, Don, Optimizing Oracle Optimizer Statistics, Oracle Articles, Mar. 1, 2004, 4 pages.

Oracle 10g New Features: Easy Management, Oracle Articles, Feb. 11, 2004, 11 pages.

Burleson, Don, Keeping Long-Term 10g Performance Metrics, Burleson Consulting, Apr. 13, 2004, 2 pages.

Oracle Assures Local Customers of Smooth Migration to 10g, Mar. 15, 2004, 2 pages, vol. 3 No. 11, GRID Today.

Foot, Chris, An Oracle Instructor's Guide to the Self-Managing Database, Part 1, dbazine.com.

Chen et al., Adaptive Selectivity Estimation Using Query Feedback, Dec. 1993, 20 pages, UMIACS-TR-93-138, CS-TR-3197, Maryland, USA.

Chen et al., Adaptive Selectivity Estimation Using Query Feedback, 1994, p. 161-172, SIGMOD 94-5/94, ACM 0-89791-639-5/94/0005, Minneapolis, USA.

Grahne et al., "Interactive Mining of Correlations—A Constraint Perspective," 1999 ACM SIGMOD Workshop on Research Issues in DMKD, Philadelphia, PA, May 30, 1999, 6pgs.

Ilyas et al., "Cords: Automatic Discovery of Correlations and Soft Functional Dependencies," SIGMOD 2004, Jun. 13-18, 2004, Paris, France, 12pgs.

Poosala et al., "Improved Histograms for Selectivity Estimation of Range Predicates," SIGMOD 1996, Montreal, Quebec, Canada, pp. 294-305.

Chaudhuri et al., "Automating Statistics Management for Query Optimizers," IEEE Transactions on Knowledge & Data Engineering, V13, N1, Jan. 2001, pp. 7-20.

Lightstone et al., "Toward Autonomic Computing with DB2 Universal Database," ACM SIGMOD Record, V31, N3, Sep. 2002, pp. 55-61.

Parekh et al., "Managing the Performance Impact of Administrative Utilities," Self-Managing Distributed Systems, 2003, pp. 130-142, Springer Berlin/Heidelberg.

Lightstone et al., "Autonomic Computing for Relational Databases: The Ten-Year Vision," INDIN 2003, Aug. 21-24, 2003, pp. 419-424.

Zhu et al., "A Piggyback Method to Collect Statistics for Query Optimization in Database Management Systems," 1998 IBM Centre for Adv. Studies Conf., Ontario, Canada, 17pgs.

Buch et al., "Oracle Database 10g Performance Overview," <www.oracleworld2003.com> 15pgs.

* cited by examiner

METHOD AND SYSTEM FOR PROVIDING A LEARNING OPTIMIZER FOR FEDERATED DATABASE SYSTEMS

CROSS-REFERENCE TO RELATED APPLICATIONS

The present application is related to U.S. patent application Ser. No. 10/864,463, filed on Jun. 10, 2004 entitled "DETECTING CORRELATION FROM DATA," and U.S. patent application Ser. No. 10/904,241 filed on Oct. 29, 2004 entitled "SYSTEM AND METHOD FOR UPDATING DATABASE STATISTICS ACCORDING TO QUERY FEEDBACK," both assigned to the assignee of the present application.

FIELD OF THE INVENTION

The present invention relates to database systems, and more particularly to a method and system for optimizing learning for federated database systems.

BACKGROUND OF THE INVENTION

Database management systems (DBMS), particularly relational DBMSs, are widely used. Conventional local DBMSs, such as DB2, utilize local data sources. Such conventional local DBMSs generally include conventional query optimizers used to generate a query execution plan for a particular query. The query execution plan determines how the particular query will be executed by the conventional local DBMS. In order to generate the query execution plan, the conventional query optimizer generates a number of prospective query execution plans and costs each of the prospective query execution plans. The cost of a particular query execution plan is effectively the time to execute the query using the query execution plan. The conventional query optimizer selects the prospective query execution plan with the lowest cost as the query execution plan for the query.

To determine the cost of a prospective query execution plan, conventional query optimizers use the cardinality for the prospective query execution plan. The cardinality is generally a major factor in determining the time, or efficiency, for executing the query. The cardinality is the number of rows processed at each intermediate step of a query execution plan. In order to determine the cardinality for the prospective query execution plan, the conventional query optimizer utilizes statistics for the conventional relational DBMS. The statistics might include the number of rows in a table, the number of distinct values for a column, histograms of the distribution of data values in a column, the number of distinct index keys, and the most frequent values in a column. Advanced conventional query optimizers may also use joint statistics on groups of columns in order to deal with possible correlations between column values. In addition, many query optimizers also utilize statistics for other parameters in determining the cost.

Although conventional query optimizers can formulate query execution plans, one of ordinary skill in the art will recognize that erroneous database statistics can cause the conventional query optimizer to improperly estimate the cardinalities. Consequently, conventional query optimizers may incorrectly determine the cost of a prospective query execution plan. This erroneous determination may result in a poor choice of query execution plan and, therefore, unacceptably long processing times for queries. Various conventional mechanisms exist for accounting for changes in statistics and improving selection of a query execution plan. However, such conventional mechanisms may be restricted to local databases.

Conventional federated Database Management Systems are conventional DBMSs that are able to interface with independent, external data sources and provide a relational view over remote data. Such external data sources might include independent instances of the same (local) database, third party relational databases and also non-relational data sources like spreadsheets and flat files. An example of such a federated DBMS includes the WebSphere Information Integrator. In a conventional federated DBMS, a query execution plan is still developed using a conventional query optimizer configured for a federated DBMS. In order to generate a query execution plan, the conventional query optimizer formulates prospective query execution plans, costs the query execution plans, and selects the query execution plan having the lowest cost, in a similar manner as for a conventional local DBMS. However, for a conventional federated DBMS, the conventional query optimizer also determines those portions of the query execution plan that will be executed by the external data sources. In particular, the conventional query optimizer considers both the cost of executing portions of the query at each external data source as well as the additional costs of the federated overhead. The conventional query optimizer determines the cost of executing portions of the query at a particular external source using the statistics on the remote data to estimate the cardinalities of the results that will come back from the external data source. Thus, whether a portion of the query is to be executed on the remote data source depend on the cost of executing the portion of the query on the external data source versus the cost of executing the portion of the query locally.

Once the portions of the query to be executed locally and remotely, by the external data source(s), are determined, SQL statements for the portions of the query being executed remotely are generated for the appropriate external data sources. The statements are executed and the resultants returned to the conventional federated DBMS. The portions of the query to be locally executed are also performed. Thus, the query can be executed by the conventional federated DBMS.

Although a conventional federated DBMS can execute queries using query execution plans, one of ordinary skill in the art will recognize that there are barriers to efficient execution of queries in a conventional federated DBMS. The usage, communication and synchronization of statistics between the federated server of the conventional federated DBMS and the remotely accessed data sources as well as incompatibilities in the statistical models used by the federated server and the external data sources may compromise selection of an efficient query execution plan. In particular, these issues may adversely affect the accuracy of the statistics for the external data source used by the conventional query optimizer in generating the query execution plan. This is true even though the conventional federated DBMS has a local mechanism for utilizing statistics to update costing of the prospective query execution plans.

Accordingly, what is needed is a method and system for improving the efficiency of query execution in a federated DBMS. The present invention addresses such a need.

BRIEF SUMMARY OF THE INVENTION

The present invention provides a method and system for accelerating execution of a query on a federated database system. The federated database system is associated with an external data source, which is used by the query. The query is performed based upon a query execution plan. The method and system comprise generating at least one optimizer query for the external data source utilized by the query. The at least one optimizer query is based on the query and obtains data related to the external data source. The method and system further include providing the at least one optimizer query to the external data source and collecting at least one resultant from the at least one optimizer query for use in generating a future query execution plan.

According to the method and system disclosed herein, the present invention provides data which can be used to analyze the efficiency of execution of queries and improve execution of queries on a federated database system.

DETAILED DESCRIPTION OF THE INVENTION

The present invention relates to federated database systems. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

Conventional local DBMSs rely upon statistics for the data in the conventional DBMS in order to calculate cardinalities and, therefore, the cost of executing queries. However, errors in the statistics may adversely affect the ability of the DBMS to accurately determine the costs of prospective query execution plans. As a result, the conventional local DBMS may select an inefficient query execution plan and result in longer execution times for queries.

In order to improve the ability of a local DBMS to accurately determine the cost of prospective query execution plans, a learning optimizer may be used. A learning optimizer is utilized to update statistics to improve the performance of a query optimizer. One such learning optimizer is described in co-pending U.S. patent application Ser. No. 10/904,241 filed on Oct. 29, 2004 entitled "METHOD AND SYSTEM FOR UPDATING DATABASE STATISTICS ACCORDING TO QUERY FEEDBACK" and assigned to the assignee of the present application. Applicant incorporates by reference the above-identified co-pending patent application. The above-identified co-pending patent application describes collection of statistics to improve the costing and selection of query execution plans in DB2. Feedback data are collected for queries that are actually executed, stored, and used in collecting statistics to recommend coffection to the costing of query execution plans. Collected query feedback information may include query predicates and the actual and estimated cardinalities for each such relational query expression.

Figure 1:
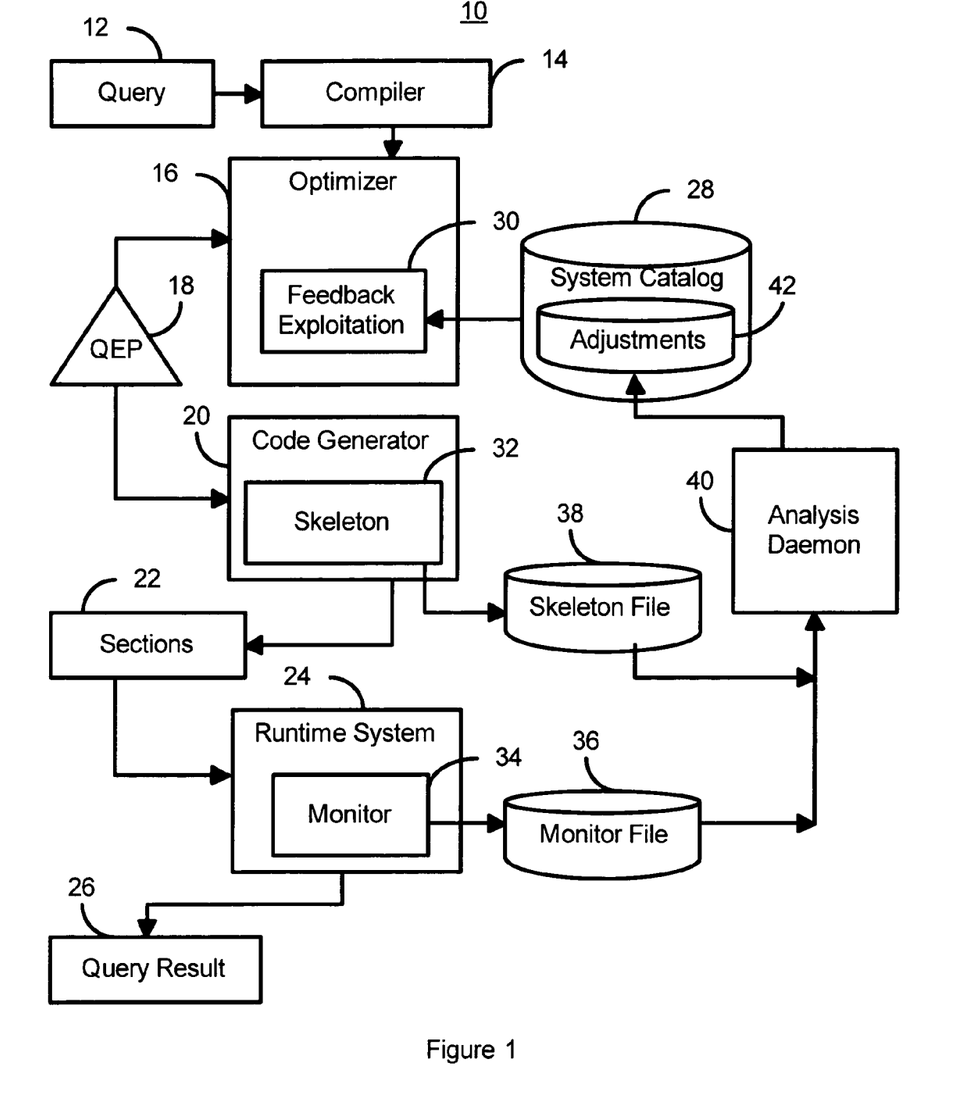
FIG. 1 is a diagram of one embodiment of a local database employing a local learning optimizer.

FIG. 1 is a diagram of one embodiment of a local DBMS 10 employing a local learning optimizer, such as is described in the above-identified co-pending application. The learning optimizer includes components 30, 32, 34, 36, 38, 40, and 42 works in conjunction with remaining components 14, 16, 20, and 24 of the local DBMS. The local DBMS compiler 14, query optimizer 16, code generator 20, and runtime system 24 in executing the query 12. The query 12 is provided to the compiler 14 and to the optimizer 16. The optimizer 16 costs prospective query execution plans based on currently available statistics and selects a query execution plan 18 for use. The currently available statistics include adjustments provided from the learning optimizer through the feedback exploitation 30. The query execution plan 18 is provided to the code generator 20, which generates the code run by the DBMS 10. The skeleton 32 in the code generator saves a skeleton of the query execution plan 18 in the skeleton file 38 for use in evaluating the efficiency of the query execution plan 18. The sections 22 of code are generated by the code generator 20 and provided to the runtime system 24. In addition, in one embodiment of the DBMS, the sections 22 of code are specially configured to provide information relating to the operators used in executing the query in accordance with the query execution plan 18. The monitor 34 collects information relating to cardinalities for each operator in the query execution plan 18 and provides the data to the monitor file 36. The runtime system 24 provides the query result 26. The skeleton and information relating to cardinalities for each operator in the query execution plan 18 are provided from the skeleton file 38 and monitor file 26, respectively, to the analysis daemon 40. The analysis daemon 40 uses these data to determine adjustments 42 that should be made to the determinations of query execution plans by the optimizer 16. Consequently, the adjustments 42 are provided to the system catalog 28 and back to the optimizer 16 in the feedback exploitation 30.

Although the system 10 and method described in the above-identified co-pending application function well for their intended purposes, one of ordinary skill in the art will readily recognize that the system 10 and method may not be readily extensible to federated DBMSs. Differences in the usage, communication and synchronization of statistics between the federated server and the external data sources as well as incompatibilities in the statistical models used by the federated server and the external data sources make collection of data related to operators difficult. Furthermore, statistics needed for the optimizer 16 may need to be determined. In addition, in one embodiment, the information on operators are determined by the monitor 34 through changes to the query 12 and the code 22 generated for the query. Such changes might not be easily made for portions of a query provided to an external data source. Consequently, a method for optimizing learning and accelerating execution of queries, in a federated DBMS is still desired.

The present invention provides a method and system for accelerating execution of a query on a federated database system. The federated database system is associated with at least one external data source, which is used by the query. The query is performed based upon a query execution plan. The method and system comprise generating at least one optimizer query for the external data source utilized by the query. The at least one optimizer query is based on the query and obtains data related to the external data source. The method and system further include providing the at least one optimizer query to the external data source and collecting at least one resultant from the at least one optimizer query for use in generating a future query execution plan.

The present invention will be described in terms of a particular DBMS utilizing a particular learning optimizer. However, one of ordinary skill in the art will readily recognize that the method and system may be utilized in other DBMSs having other and/or different learning optimizers.

Figure 2:
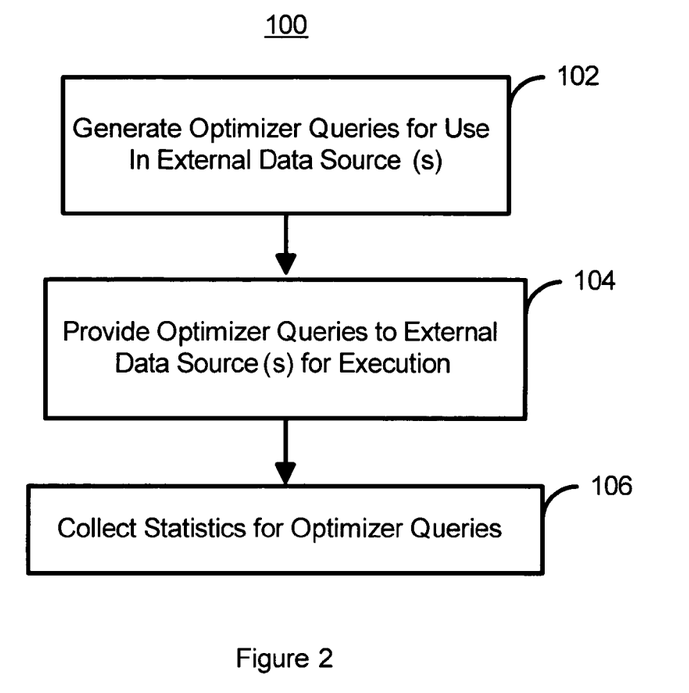
FIG. 2 is a high-level flow chart depicting one embodiment of a method in accordance with the present invention that aids in utilizing a learning optimizer in a federated database.

FIG. 2 is a high-level flow chart depicting one embodiment of a method 100 in accordance with the present invention that aids in utilizing a learning optimizer in a federated DBMS. The federated DBMS in which the method 100 is utilized is associated with at least one, and generally more, external data sources. Thus, queries executed on the federated database may utilize external data sources. In addition, as in a conventional DBMS, the query is executed in accordance with a query execution plan. The query execution plan indicates that at least a portion of the query is to be executed on the external data source.

Optimizer queries are generated for the external data source(s) used in executing the query in accordance with the query execution plan, via step 102. The particular optimizer queries generated depend upon the portion of the query being executed on the external data source. In a preferred embodiment, the optimizer queries obtain information about the cardinalities of the operators used by the external data source(s) in executing the portion of the query in accordance with the query execution plan. Thus, at least one optimizer query may be generated for each of the external data sources used in executing the query. The optimizer queries provided may be configured to utilize resources of the external data source(s) used in executing the query. For example, the optimizer query may use proprietary monitoring tools, if any, on the external data source, common table expressions, user-defined table functions, or count statements to determine cardinalities of operators used by the external data source in executing the query. The optimizer queries may also sample the external data source. Sampling may be particularly effective in improving the efficiency of the optimizer queries where the external data source stores a large amount of data. Also in a preferred embodiment, the optimizer query is a separate query that is generated. However, in an alternate embodiment, generating the optimizer query in step 102 could include rewriting the query to obtain the information both the original query and the optimizer query.

The optimizer queries are provided for execution to the external data sources, via step 104. In one embodiment, the optimizer queries may provide immediate feedback, for example by piggy backing the optimizer queries with the portion of the query being executed on the external data source. In another embodiment, deferred feedback is obtained by deferring step 104. For example, instead of performing step 104 at substantially the same time as at least a portion of the query is executed by the external data source, step 104 may be performed at a time when the load on the external data source is reduced. Although deferring step 104 may result in inaccurate statistics being used in forming the query execution plan, performance may be improved by reducing the load on the external data source. Furthermore, multiple considerations may be taken into account in determining when to perform step 104. For example, step 104 may be deferred based on both the load on the external data source, the query itself, the identity of the external data source corresponding to particular optimizer queries, and the probability that statistics for the external data source are changing. Step 104 may also include storing one or more of the query, the query execution plan, the optimizer queries, and a skeleton of the query execution plan.

The resultant(s) are collected from execution of the optimizer queries for use in generating a future query execution plan, via step 106. Step 106 may include using the resultants of the optimizer queries from the external data sources to collect statistics on operation of the external data source(s). Thus, feedback from the external data source may be stored in step 106. Step 106 may also include correlating the query, the query execution plan and/or other information of interest with the resultants of the optimizer queries. Once statistics are collected for the optimizer queries, the statistics may be analyzed to determine whether the information provided to the optimizer should be updated to improve the selection of a query execution plan. In a preferred embodiment, this analysis may be performed utilizing the learning optimizer of the above-identified co-pending patent application.

Thus, using the method 100, appropriate statistics for external data sources of a federated DBMS may be obtained. Once the statistics are analyzed, it may be determined whether and how the optimizer for the federated DBMS should be updated in order to improve selection of a query execution plan. The information obtained could also be used for other purposes. For example, actions could be recommended to improve efficiency of the external data source or other aspects of the federated DBMS.

Figure 3:
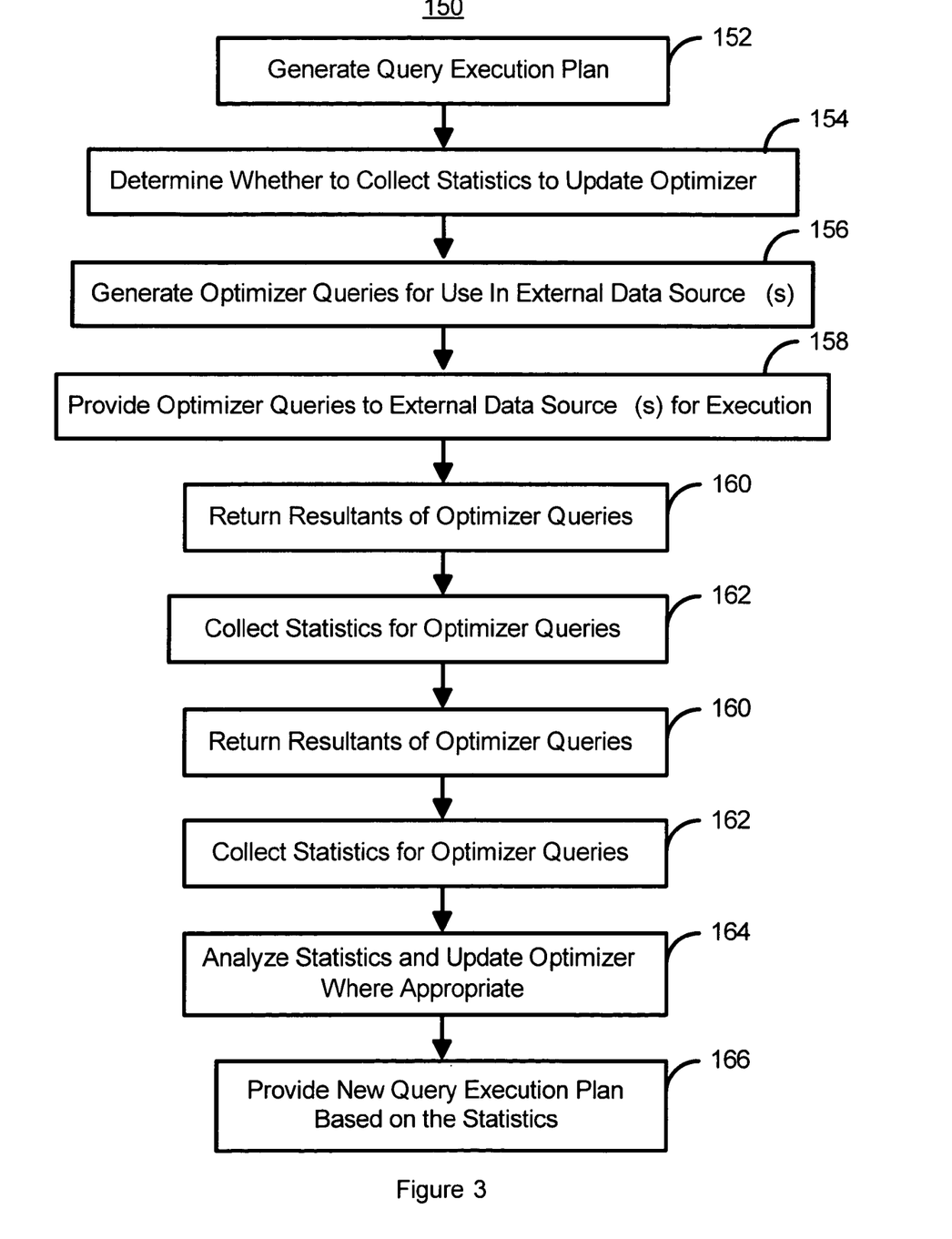
FIG. 3 is a flow chart depicting an embodiment of a method in accordance with the present invention that aids in utilizing a learning optimizer in a federated database.

FIG. 3 is a flow chart depicting an embodiment of a method 150 in accordance with the present invention that aids in utilizing a learning optimizer in a federated database. The federated DBMS in which the method 150 is utilized is associated with at least one, and generally more, external data sources. Thus, queries executed on the federated database may utilize external data sources.

A query execution plan is generated based on currently available statistics, via step 152. Step 152 includes parsing the query to determine which portion of the query, including all, is to be executed on the external data source(s). It is determined, based on the query execution plan, whether the statistics for the external data source should be collected using the at least one optimizer query, via step 154. Step 154 may include comparing cardinalities for tables in the query execution plan to cardinalities that are the resultant(s) of previous optimizer queries as well as determining which statistics used in forming the query execution plan are outdated.

Optimizer queries are generated for the external data source(s) used in executing the query in accordance with the query execution plan, via step 156. The particular optimizer queries generated depend upon the portion of the query being executed on the external data source and the determination in step 154 of which statistics are to be updated. In a preferred embodiment, the optimizer queries obtain information about the cardinalities of the operators used by the external data source in executing the portion of the query in accordance with the query execution plan. The optimizer queries provided may be configured to utilize resources of the external data source. For example, the optimizer query may use proprietary monitoring tools, if any, on the external data source, common table expressions, user-defined table functions, or count statements to determine cardinalities of operators used by the external data source in executing the query. The optimizer queries may also sample the external data source. Sampling may be particularly effective in improving the efficiency of the optimizer queries where the external data source stores a large amount of data.

The optimizer queries are provided for execution to the external data sources, via step 158. In one embodiment, the optimizer queries may provide immediate feedback, for example by piggy backing the optimizer queries with the portion of the query being executed on the external data source. In another embodiment, deferred feedback is obtained by deferring step 158. For example, instead of performing step 158 at substantially the same time as at least a portion of the query is executed by the external data source, step 158 may be performed at a time when the load on the external data source is reduced. Although deferring step 158 may result in inaccurate statistics being used in forming the query execution plan, performance may be improved by reducing the load on the external data source. Furthermore, multiple considerations may be taken into account in determining when to perform step 158. For example, step 158 may be deferred based on both the load on the external data source, the query itself, the identity of the external data source corresponding to particular optimizer queries, and the probability that statistics for the external data source are changing. Step 158 may also include storing one or more of the query, the query execution plan, the optimizer queries, and a skeleton of the query execution plan.

The resultant(s) for the at least one optimizer queries are received from the external data source, via step 160. Statistics are collected from resultants of the execution of the optimizer queries for use in generating a future query execution plan, via step 162. Step 162 may also include storing the resultant(s) and/or the statistics. Thus, feedback from the external data source may be stored in step 162. Step 162 may further include correlating the query, the query execution plan and/or other information of interest with the resultants of the optimizer queries.

Once statistics are collected for the optimizer queries, the statistics are analyzed to determine whether the information provided to the optimizer should be updated to improve the selection of a query execution plan, via step 164. In a preferred embodiment, this analysis may be performed utilizing the learning optimizer of the above-identified co-pending patent application. The future query execution plan for another query may then be provided, via step 166.

Thus, using the method 150, appropriate statistics for external data sources of a federated DBMS may be obtained. Based on the analysis of the statistics, the optimizer can be updated and selection of a future query execution plan can be improved. Thus, efficiency of query execution in a federated DBMS can be improved. Furthermore, the statistics obtained could be used for other purposes. For example, actions could be recommended to improve efficiency of the external data source or other aspects of the federated DBMS.

Figure 4:
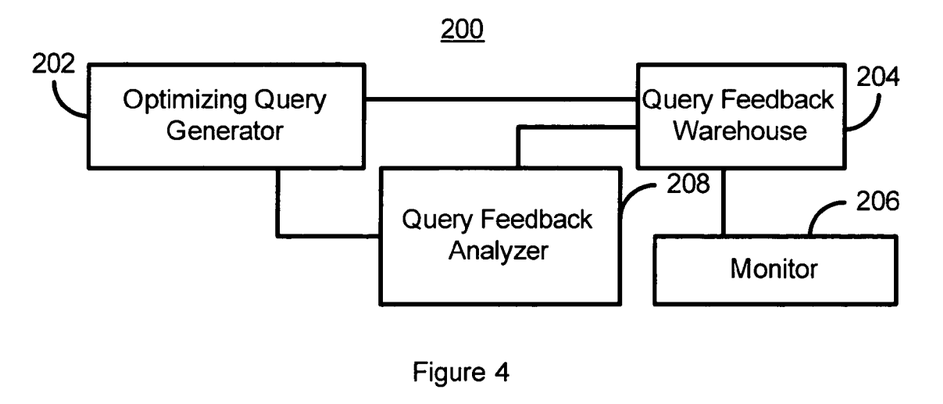
FIG. 4 is a block diagram depicting one embodiment of a system in accordance with the present invention that aids in utilizing a learning optimizer in a federated database.

FIG. 4 is a block diagram depicting one embodiment of a system 200 in accordance with the present invention that aids in utilizing a learning optimizer in a federated database. The system 200 may be utilized in performing the methods 100 and/or 150. The system 200 includes an optimizer query generator 202, a query feedback warehouse 204, a monitor 206, and a query feedback analyzer 208. The optimizer query generator 202 generates the optimizer queries for the external data sources utilized by the queries. The optimizer query generator 202 may be considered to be part of the optimizer (not shown) of the federated database. The optimizer query generator 202 is preferably used in steps 102 and 156 of the methods 100 and 150, respectively.

The query feedback warehouse 204 is used for storing statistics from execution of the optimizer queries. In addition, the query feedback warehouse 204 may also store one or more of the query, the query execution plan, the optimizer queries, and a skeleton of the query execution plan. In a preferred embodiment, the query feedback warehouse 204 is organized into relational tables. In one such embodiment, a feedback query table may store the query and a skeleton of the query execution plan in one table, predicate information may be stored in another table, the feedback, or resultants, from execution of the optimizer queries in another table, and recommendations for updating the statistics for formulating query execution plans in another table. The monitor 206 is used in collecting the resultants of the execution of the optimizer queries. In one embodiment, the monitor 206 includes a plan monitor and a runtime monitor (not separately depicted). In such an embodiment, the plan monitor stores at least a skeleton of the query execution plan. The runtime monitor collects the resultants of the execution of the optimizer queries. The query feedback analyzer 208 determines, based on the query execution plan and at least one previous optimizer query, whether the statistics for the external data source should be collected using the at least one optimizer query. In one embodiment, the query feedback analyzer 208 includes a cardinality analyzer and a correlation analyzer to determine whether statistics for a particular table are outdated and to determine correlations between columns in a table. Using the system 200, the methods 100 and 150 may be executed and execution of queries in the federated DBMS improved.

Figure 5:
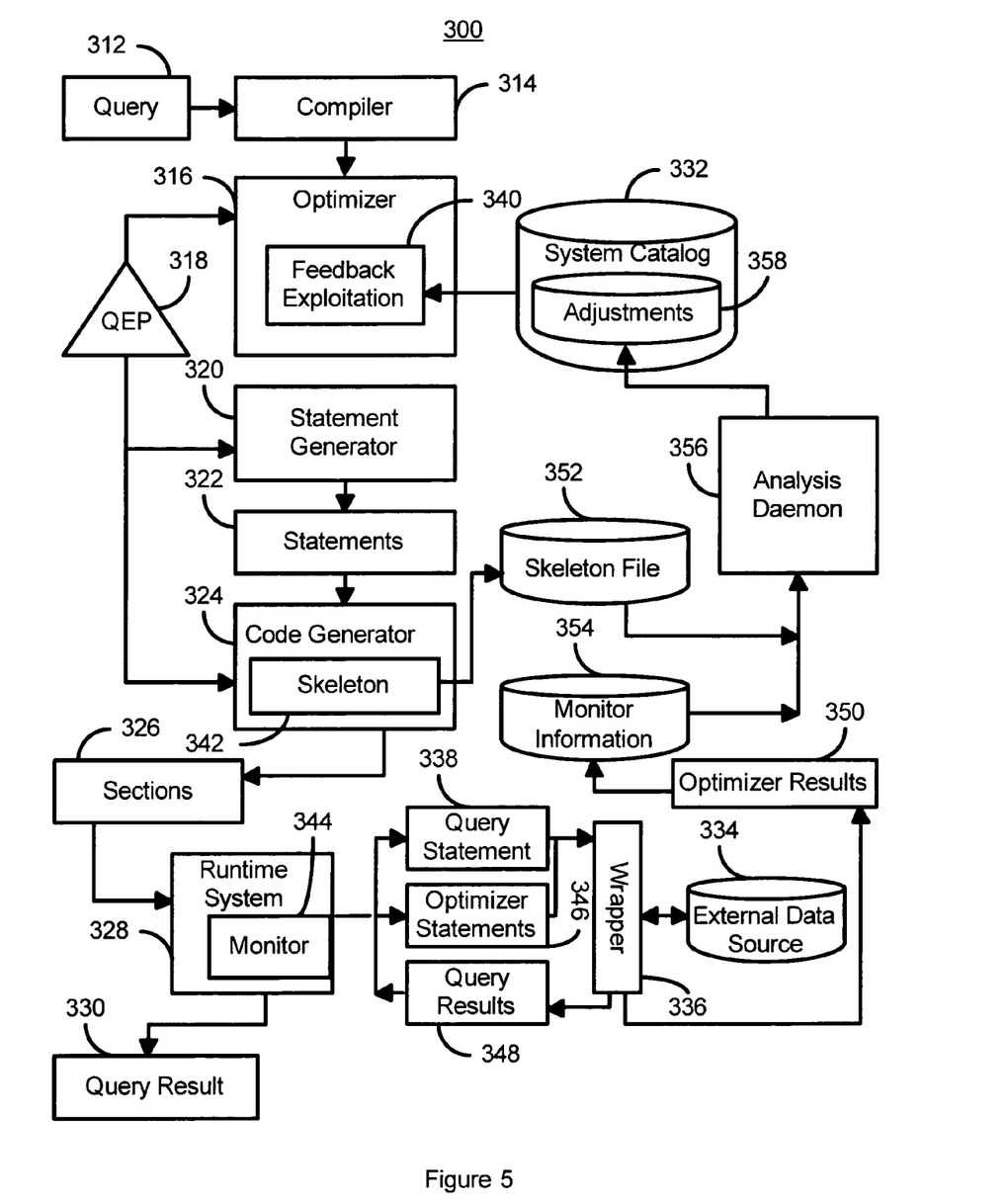
FIG. 5 depicts one embodiment of the architecture for a system in accordance with the present invention utilizing a learning optimizer.

FIG. 5 depicts one embodiment of the architecture 300 for a system in accordance with the present invention utilizing a learning optimizer. The architecture 300 is used in performing the methods 100 and/or 150. The system 300 includes a compiler 314 that is preferably an SQL compiler, an optimizer 316, statement generator 320, code generator 324, a runtime system 328, a system catalog 332, a wrapper 336, and an external data source 334, that are analogous to a conventional architecture, as well as the feedback exploitation 340, skeleton 342, optimizer monitor 344, optimizer skeleton 352, monitor information 354, an analysis daemon 356, and adjustments to the optimizer 358.

In operation, the query 312 is provided to the compiler 314 and then to the optimizer 316. The optimizer 316 costs prospective query execution plans based on currently available statistics and selects a query execution plan 318 for use. The currently available statistics include adjustments provided from the learning optimizer through the feedback exploitation 340. The adjustments provided may include adjustments based upon monitoring of the local functioning of the federated DBMS as well as adjustments based upon data obtained through the use of the optimizer queries. Feedback exploitation 340 may also be used to determine the optimizer queries associated with the query 312. Thus, the query execution plan 318 indicates both the plan for executing the query 312 as well as the optimizer queries (not specifically depicted).

The query execution plan 318 is provided to the statement generator 320 as well as to the code generator. Statements 322 generated by the statement generator are provided to the code generator 324, which generates the code for the query 312 and the optimizer queries. The skeleton 342 in the code generator saves a skeleton of the query execution plan 318 in the skeleton file 352 for use in evaluating the efficiency of the query execution plan 318 and, in some embodiments, for use in determining whether the optimizer queries should be generated to obtain statistics for the external data source 334. The sections 326 of code are generated by the code generator 324 and provided to the runtime system 328. In one embodiment of the DBMS, the sections 326 of code are specially configured to provide information relating to any operators used locally in executing the query in accordance with the query execution plan 318. In addition, the sections 326 of code include sections for the optimizer queries.

The local monitor 344 collects information relating to cardinalities for each local operator in the query execution plan 318 and provides the data to the monitor information 350. The runtime system 328 also provides the query result 330.

The query statements 338 corresponding to the query 312 as well as the optimizer statements 346 corresponding to the optimizer queries are provided to the wrapper 336. The wrapper 336 provides the statements 338 and 346 to the external data source 334 in the appropriate format. After execution, the external data source 334 returns the results to the wrapper 336. The external query results 348 are provided to the runtime system 328 for use in formulating the query result 330. The optimizer query results 350 are provided to the monitor information 354. The skeleton and other information stored in the skeleton file 352 and monitor information 354 may be provided to the analysis daemon 356.

The analysis daemon 356 analyzes the statistics for the query and optimizer queries and provides adjustments 358, if any, to the system catalog. These adjustments may then be used in improving the performance of the system 100 or making recommendations to users. Thus, using the methods 100 and/or 150 and the systems 200 and/or 300 performance of the federated DBMS can be improved.

A method and system for utilizing a learning optimizer in a federated database has been disclosed. The present invention has been described in accordance with the embodiments shown, and one of ordinary skill in the art will readily recognize that there could be variations to the embodiments, and any variations would be within the spirit and scope of the present invention. Software written according to the present invention is to be stored in some form of computer-readable medium, such as memory, CD-ROM or transmitted over a network, and executed by a processor. Consequently, a computer-readable medium is intended to include a computer readable signal which, for example, may be transmitted over a network. Accordingly, many modifications may be made by one of ordinary skill in the art without departing from the spirit and scope of the appended claims.

We claim:

1. A method to accelerate execution of a query on a federated database system, the federated database system being associated with an external data source, the query utilizing the external data source and being performed based upon a query execution plan, the method comprising:
    generating at least one optimizer query for the external data source utilized by the query, the optimizer query used in generating a future query execution plan, the at least one optimizer query being based on the query and obtains data related to the external data source, wherein the at least one optimizer query is generated by a federated server of the federated database system, and wherein the external data source is independent with respect to the federated server;
    providing the at least one optimizer query to the external data source to execute using the external data source;
    collecting at least one resultant from execution of the at least one optimizer query to use in generating the future query execution plan;
    analyzing the collected statistics to provide the future query execution plan;
    providing the future query execution plan, and wherein the step of generating at least one optimizer query further includes parsing the query to determine a portion of the query utilizing the external data source, and generating at least one optimizer query based on the portion of the query utilizing the external data source, and wherein the external data source utilizes at least one operator to execute the query, with the at least one optimizer query being used to determine the at least one resultant for the at least one operator.

2. The method of claim 1 further comprising:
    collecting the statistics on the at least one resultant.

3. The method of claim 2 further comprising:
    analyzing the statistics to provide the future query execution plan; and
    providing the future query execution plan.

4. The method of claim 1 wherein the external data source includes a proprietary monitoring tool and wherein the at least one optimizer query utilizes the proprietary monitoring tool in order to obtain the statistics.

5. The method of claim 1 wherein the at least one optimizer query includes at least one of a user-defined table function and a count statement.

6. The method of claim 1 wherein the at least one optimizer query further is configured to perform sampling on the external data source.

7. The method of claim 1 wherein the providing step further includes:
    providing the at least one optimizer query to the external data source at a time based on the query being provided.

8. The method of claim 7 wherein the at least one optimizer query is provided to the external data source at the same time as the query.

9. The method of claim 1 wherein the providing step further includes:
    deferring the at least one optimizer query from being provided to the external data.

10. The method of claim 9 wherein the providing step further includes:
    providing the at least one optimizer query to the external data source based on a usage of the external data source.

11. A system to accelerate execution of a query on a federated database system, the federated database system being associated with an external data source, the query utilizing the external data source and being performed based upon a query execution plan, the system comprising:
    a hardware mechanism that provides an optimizer query generator to generate at least one optimizer query for the external data source utilized by the query, the optimizer query used in generating a future query execution plan, the at least one optimizer query being based on the query and obtains data related to the external data source, the at least one optimizer query being provided to the external data source to be executed, wherein the optimizer query generator is included in a federated sewer of the federated database system, and wherein the external data source is independent with respect to the federated server;
    a query feedback warehouse to store statistics from execution of the at least one optimizer query, the statistics to be used in generating the future query execution plan;
    a monitor to collect the at least one resultant from execution of the at least one optimizer query, and
    wherein the optimizer query generator further parses the query to determine a portion of the query utilizing the external data source and generates the at least one optimizer query based on the portion of the query utilizing the external data source and the external data source utilizes at least one operator to execute the query and wherein the at least one optimizer query is used in determining the statistics for the at least one operator.

12. The system of claim 11 further comprising:
a query feedback analyzer to determine, based on the query execution plan and at least one previous optimizer query, whether the at least one resultant for the external data source should be collected using the at least one optimizer query.

13. The system of claim 11 wherein the optimizer query generator further generates the at least one optimizer query based on available statistics for the external data source.

14. A computer-readable storage medium containing a program, when executed by a computer, to accelerate execution of a query on a federated database system, the federated database system being associated with an external data source, the query utilizing the external data source and being performed based upon a query execution plan, the program including instructions for:

generating at least one optimizer query for the external data source utilized by the query, the optimizer query used in generating a future query execution plan, the at least one optimizer query being based on the query and obtains data related to the external data source, wherein the at least one optimizer query is generated by a federated server of the federated database system, and wherein the external data source is independent with respect to the federated server;

providing the at least one optimizer query to the external data source to execute using the external data source;

collecting statistics from execution of the at least one optimizer query to use in generating the future query execution plan;

analyzing the collected statistics to provide the future query execution plan;

providing the future query execution plan, and wherein the step of generating at least one optimizer query further includes parsing the query to determine a portion of the query utilizing the external data source, and generating at least one optimizer query based on the portion of the query utilizing the external data source, and wherein the external data source utilizes at least one operator to execute the query, with the at least one optimizer query being used to determine the at least one resultant for the at least one operator.

* * * * *

UNITED STATES PATENT AND TRADEMARK OFFICE
CERTIFICATE OF CORRECTION

PATENT NO. : 7,610,264 B2  Page 1 of 1
APPLICATION NO. : 11/068253
DATED : October 27, 2009
INVENTOR(S) : Ewen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 500 days.

Signed and Sealed this

Twelfth Day of October, 2010

David J. Kappos
*Director of the United States Patent and Trademark Office*